(12) United States Patent
Ong et al.

(10) Patent No.: US 10,865,142 B2
(45) Date of Patent: *Dec. 15, 2020

(54) METHOD OF MAKING CEMENTITIOUS COMPOSITIONS

(71) Applicant: Construction Research & Technology GmbH, Trostberg (DE)

(72) Inventors: Frank Shaode Ong, Solon, OH (US); Rick Paponetti, Bedford, OH (US); James C. Smith, Cuyahoga Falls, OH (US); Stefan Muessig, Sagamore Hills, OH (US)

(73) Assignee: Construction Research & Technology GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,785

(22) Filed: Mar. 26, 2020

(65) Prior Publication Data

US 2020/0223753 A1 Jul. 16, 2020

Related U.S. Application Data

(63) Continuation of application No. 14/560,250, filed on Dec. 4, 2014, now Pat. No. 10,640,422.

(60) Provisional application No. 61/912,895, filed on Dec. 6, 2013.

(51) Int. Cl.
| | | |
|---|---|---|
| C04B 16/08 | (2006.01) |
| C04B 30/00 | (2006.01) |
| C04B 28/02 | (2006.01) |
| C04B 28/04 | (2006.01) |
| C04B 14/00 | (2006.01) |
| C04B 24/02 | (2006.01) |
| C04B 24/10 | (2006.01) |
| C04B 111/20 | (2006.01) |

(52) U.S. Cl.
CPC .............. *C04B 16/08* (2013.01); *C04B 14/00* (2013.01); *C04B 24/023* (2013.01); *C04B 24/10* (2013.01); *C04B 28/02* (2013.01); *C04B 28/04* (2013.01); *C04B 30/00* (2013.01); *C04B 2111/29* (2013.01)

(58) Field of Classification Search
CPC ..... C04B 16/08; C04B 16/082; C04B 16/085; C04B 30/00; C04B 28/02; C04B 28/04; C04B 14/00; C04B 24/023; C04B 24/10; C04B 2111/29

See application file for complete search history.

(56) References Cited

U.S. PATENT DOCUMENTS

| | | |
|---|---|---|
| 2,361,297 A | 10/1944 | Kutsche |
| 4,005,033 A | 1/1977 | Georgeau et al. |
| 4,057,526 A | 11/1977 | De Rook |
| 4,513,106 A | 4/1985 | Edgren et al. |
| 4,538,733 A | 9/1985 | Hoffman |
| 4,778,829 A | 10/1988 | Ichimura et al. |
| 5,016,689 A | 5/1991 | McGarvey et al. |
| 5,304,303 A | 4/1994 | Kozak, III |
| 6,084,011 A | 7/2000 | Lucero et al. |
| 6,133,347 A | 10/2000 | Vickers, Jr. et al. |
| 6,451,881 B1 | 9/2002 | Vickers, Jr. et al. |
| 6,492,461 B1 | 12/2002 | Vickers, Jr. et al. |
| 7,435,766 B2 | 10/2008 | Ong |
| 7,543,642 B2 | 6/2009 | Reddy et al. |
| 2004/0144537 A1 | 7/2004 | Reddy et al. |
| 2005/0061206 A1 | 3/2005 | Reddy et al. |
| 2005/0274285 A1 | 12/2005 | Christensen et al. |
| 2005/0284340 A1 | 12/2005 | Vickers, Jr. et al. |
| 2006/0281835 A1 | 12/2006 | Ong |
| 2006/0281836 A1* | 12/2006 | Kerns ..................... C04B 24/18 524/2 |
| 2007/0098973 A1 | 5/2007 | Wagner et al. |
| 2007/0137528 A1 | 6/2007 | Le Roy-Delage et al. |
| 2007/0154711 A1 | 7/2007 | Masuda et al. |
| 2009/0093558 A1 | 4/2009 | Madish et al. |
| 2009/0093588 A1 | 4/2009 | Akutsu et al. |
| 2009/0149559 A1 | 6/2009 | Masuda et al. |
| 2011/0281964 A1 | 11/2011 | Zmarsly et al. |
| 2013/0280364 A1 | 10/2013 | Ong et al. |

(Continued)

FOREIGN PATENT DOCUMENTS

| | | |
|---|---|---|
| DE | 1961390 A1 | 6/1971 |
| DE | 102006009842 A1 | 9/2007 |

(Continued)

OTHER PUBLICATIONS

PCT/EP2013/058155—International Search Report dated Sep. 2, 2013.
PCT/EP2013/058155—International Written Opinion dated Sep. 2, 2013.
PCT/EP2013/037455—International Search Report dated Sep. 2, 2013.
PCT/EP2013/037455—International Written Opinion dated Sep. 2, 2013.
PCT/EP2013/058156—International Search Report dated Sep. 2, 2013.

(Continued)

*Primary Examiner* — Christopher M Rodd
(74) *Attorney, Agent, or Firm* — Curatolo Sidoti Co., LPA; Salvatore A. Sidoti

(57) ABSTRACT

A method of manufacturing a cementitious composition comprising: dispersing expanded polymeric microspheres into a liquid dispersion, optionally wherein the liquid dispersion comprises an aqueous dispersion; and incorporating the liquid dispersion comprising expanded polymeric microspheres into the cementitious composition; wherein the expanded polymeric microspheres are present in the liquid dispersion in an amount of about 0.1 to about 15 percent by weight, based on the total weight of the dispersion, prior to incorporation into the cementitious composition. An admixture for cementitious compositions comprising unexpanded polymeric microspheres and sodium hydroxide.

20 Claims, 3 Drawing Sheets

(56) References Cited

U.S. PATENT DOCUMENTS

| | | | |
|---|---|---|---|
| 2013/0281556 A1 | 10/2013 | Ong et al. | |
| 2014/0107238 A1 | 4/2014 | Ong et al. | |
| 2015/0361002 A1 | 12/2015 | Ong et al. | |

FOREIGN PATENT DOCUMENTS

| | | | |
|---|---|---|---|
| EP | 0320473 | A1 | 6/1989 |
| EP | 0950699 | A1 | 10/1999 |
| FR | 2072897 | A5 | 9/1971 |
| GB | 2347413 | A | 9/2000 |
| JP | 01271225 | A | 10/1989 |
| JP | 2005254213 | A | 9/2005 |
| JP | 5588880 | B2 | 9/2014 |
| WO | 03051793 | A2 | 6/2003 |
| WO | 2004056549 | A1 | 7/2004 |
| WO | 2006133855 | A2 | 12/2006 |
| WO | 2009040359 | A1 | 4/2009 |
| WO | 2010070987 | A1 | 6/2010 |
| WO | 2013156589 | A | 10/2013 |
| WO | 2013159043 | A1 | 10/2013 |
| WO | 2014198532 | A1 | 12/2014 |

OTHER PUBLICATIONS

PCT/EP2013/058156—International Written Opinion dated Sep. 2, 2013.
Moennig, et al., Water saturated super-absorbent polymers used in high strength concrete, Otto-Graf-Journal: Annual Journal on Research and Testing of Materials, Jan. 1, 2005, vol. 16, pp. 193-202, Stuttgard, Germany.
Memon, et al., Effect of Sodium Hydroxide Concentration on Fresh Properties and Compressive Strength of Sel-Compacting Geopolymer Concrete, Journal of Engineering Science & Technology, 2013, pp. 46-56, vol. 8, Issue 1.
U.S. Appl. No. 13/866,702—Office Action dated Nov. 18, 2014.
U.S. Appl. No. 13/866,702—Office Action dated Jun. 10, 2015.
U.S. Appl. No. 14/515,201—Office Action dated Aug. 21, 2015.
Canadian Patent Application No. 2,869,842—Office Action dated Feb. 12, 2016.
U.S. Appl. No. 13/866,702—Office Action dated Aug. 4, 2014.
U.S. Appl. No. 14/560,250—Office Action dated Mar. 8, 2016.
PCT/EP2015/078633—International Search Report dated May 4, 2016.
PCT/EP2013/058155—International Preliminary Report on Patentability dated Oct. 30, 2014.
Jensen, et al., Water-entrained cement-based materials II. Experimental Observations, Cement and Concrete Research, 2002, pp. 973-978.
PCT/EP2015/078633—International Written Opinion dated May 4, 2016.
European Patent Application No. 15152251.3—European Search Report dated Aug. 17, 2015.
PCT/EP2015/078630—International Search Report dated Mar. 1, 2016.
PCT/EP2015/078630—International Written Opinion dated Mar. 1, 2016.
PCT/EP2015/078631—International Search Report dated Feb. 2, 2016.
PCT/EP2015/078631—International Written Opinion dated Feb. 2, 2016.
PCT/EP2015/078632—International Search Report dated Feb. 2, 2016.
PCT/EP2015/078632—International Written Opinion dated Feb. 2, 2016.
U.S. Appl. No. 13/835,467—Office Action dated Mar. 4, 2014.
U.S. Appl. No. 13/835,467—Office Action dated Jun. 10, 2014.
U.S. Appl. No. 13/835,467—Office Action dated Feb. 3, 2015.
U.S. Appl. No. 13/836,495—Office Action dated Feb. 20, 2015.
U.S. Appl. No. 13/835,467—Office Action dated May 13, 2015.
U.S. Appl. No. 13/836,495—Office Action dated Jun. 16, 2015.
U.S. Appl. No. 13/835,467—Office Action dated Dec. 8, 2015.
U.S. Appl. No. 15/093,848—Office Action dated Jun. 28, 2016.
U.S. Appl. No. 14/560,250—Office Action dated Aug. 25, 2016.
U.S. Appl. No. 15/093,848—Office Action dated Oct. 7, 2016.
U.S. Appl. No. 14/837,575—Office Action dated Feb. 2, 2017.
U.S. Appl. No. 14/560,250—Office Action dated Feb. 13, 2017.
U.S. Appl. No. 14/837,575—Office Action dated May 4, 2017.
Making Concrete for Use in Water Well Construction: the basics by a Layman's Guide to Clean Water, Wayback Machine time capture dated Jun. 28, 2012, http://www.clean-water-for-laymen.com/making-concrete.html.

\* cited by examiner

METHOD OF MAKING CEMENTITIOUS COMPOSITIONS

This application is a continuation of co-pending U.S. Ser. No. 14/560,250, filed Dec. 4, 2014, which claims the benefit of the filing date under 35 U.S.C. § 119(e) from U.S. Provisional Application for Patent Ser. No. 61/912,895, filed on Dec. 6, 2013, both of which applications are hereby incorporated by reference in their entireties.

Provided are methods of manufacturing cementitious compositions including expanded polymeric microspheres and cementitious compositions manufactured thereby.

Freeze-thaw cycles can be extremely damaging to water-saturated hardened cementitious compositions, such as concrete. The best known technique to prevent or reduce the damage done is the incorporation in the composition of microscopically fine pores or voids. The pores or voids function as internal expansion chambers and can therefore protect the composition from freeze-thaw damage by relieving changes in hydraulic pressure caused by freeze-thaw cycling. A conventional method used for producing such voids in cementitious compositions is by introducing air-entraining agents into the compositions, which stabilize tiny bubbles of air that are entrapped in the composition during mixing.

Unfortunately, this approach of producing air voids in cementitious compositions is plagued by a number of production and placement issues, some of which are the following:

Air Content: Changes in air content of the cementitious composition can result in a composition with poor resistance to freeze-thaw damage if the air content drops with time or reduce the compressive strength of the composition if the air content increases with time. Examples are pumping a cementitious composition (decreasing air content by compression), job-site addition of a superplasticizer (often elevates air content or destabilizes the air void system), and interaction of specific admixtures with the air-entraining surfactant (that could increase or decrease air content).

Air Void Stabilization: The inability to stabilize air bubbles may be caused by the presence of materials that adsorb the stabilizing surfactant, i.e., fly ash having high surface area carbon or insufficient water for the surfactant to work properly, i.e, low slump concrete.

Air Void Characteristics: Formation of bubbles that are too large to provide resistance to freezing and thawing damage may be the result of poor quality or poorly graded aggregates, use of other admixtures that destabilize the bubbles, etc. Such voids are often unstable and tend to float to the surface of the fresh concrete.

Overfinishing: Removal of air by overfinishing, removes air from the surface of the concrete, typically resulting in distress by scaling of the detrained zone of cement paste adjacent to the overfinished surface.

The generation and stabilization of air at the time of mixing and ensuring it remains at the appropriate amount and air void size until the cementitious composition hardens remain the largest day-to-day challenges for cementitious composition producers throughout the world. The air content and the characteristics of the air void system entrained into the cementitious composition cannot be controlled by direct quantitative means, but only indirectly through the amount and/or type of air-entraining agent added to the composition. Factors such as the composition and particle shape of the aggregates, the type and quantity of cement in the mix, the consistency of the cementitious composition, the type of mixer used, the mixing time, and the temperature all influence the performance of the air-entraining agent. The void size distribution in ordinary air-entrained concrete can show a very wide range of variation, between 10 and 3,000 micrometers (µm) or more. In such cementitious compositions, besides the small voids which are essential to cyclic freeze-thaw damage resistance, the presence of larger voids, which contribute little to the durability of the cementitious composition and could reduce the strength of the composition, has to be accepted as an unavoidable feature.

Air-entraining agents have been shown to provide resistance to freeze-thaw damage, as well as scaling damage resistance, which occurs when the surface of the hardened cementitious composition breaks away for any of a number of reasons, some of which are discussed above. However, because conventional air-entraining agents suffer from the problems discussed above, the cementitious composition industry is searching for new and better admixtures to provide the properties which are currently provided by conventional air-entraining agents.

A recent development is to use polymeric microspheres to create controlled-size voids within cementitious compositions. However, development is still ongoing to improve the function of polymeric microspheres within cementitious compositions, and to reduce the cost of including polymeric microspheres in cementitious compositions.

In order to provide appropriately sized air voids, polymeric microspheres may need to be expanded prior to incorporation into cementitious compositions. Expanded polymeric microspheres are typically provided to manufacturers of cementitious compositions in dry or minimally wetted forms, in order to minimize shipping costs. FIG. 1 is a photograph of expanded, expandable polymeric microspheres after expansion, in a minimally wetted form. However, it has been found that adding dry or minimally wetted expanded polymeric microspheres directly into cementitious compositions provides inconsistent physical properties, including freeze-thaw damage resistance, of cementitious articles made from the cementitious compositions.

What are needed are methods of manufacturing cementitious compositions including expanded polymeric microspheres which provide cementitious articles made from the cementitious compositions which have predictable, consistent physical properties.

Embodiments of the subject matter are disclosed with reference to the accompanying drawings and are for illustrative purposes only. The subject matter is not limited in its application to the details illustrated in the drawings.

Figure 1:
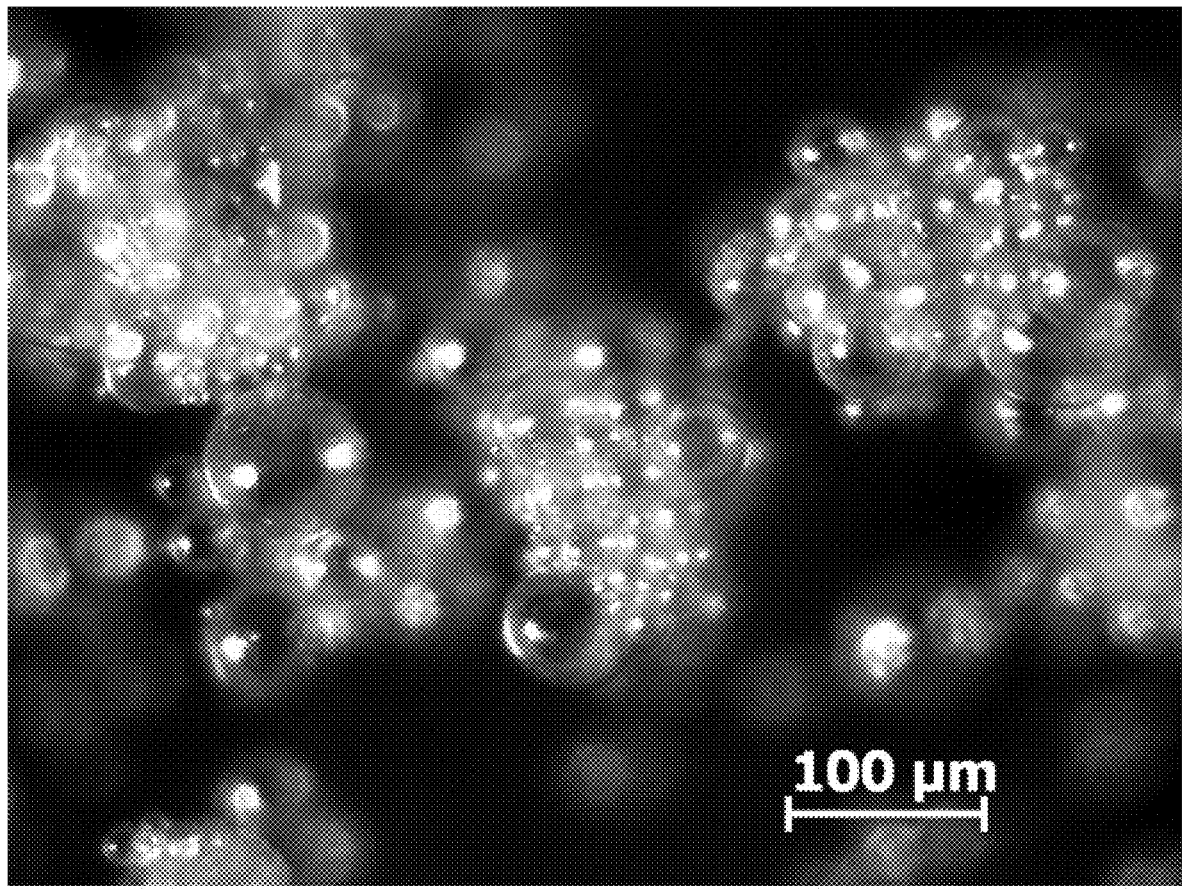
FIG. 1 is a photomicrograph of expanded microspheres in a minimally wetted form.

The expanded polymeric microspheres provide void spaces in cementitious compositions prior to final setting, and such void spaces act to increase the freeze-thaw durability of the cementitious material. Expanded polymeric microspheres introduce voids into cementitious compositions to produce a fully formed void structure in cementitious compositions which resists concrete degradation produced by water-saturated cyclic freezing and does not rely on air bubble stabilization during mixing of the cementitious compositions. The freeze-thaw durability enhancement produced with the expanded polymeric microspheres is based on a physical mechanism for relieving stresses produced when water freezes in a cementitious material. In conventional practice, as discussed above, properly sized and spaced voids are generated in the hardened material by using chemical admixtures to stabilize the air voids entrained into a cementitious composition during mixing. In conventional cementitious compositions these chemical admixtures as a class are called air entraining agents. The present subject matter utilizes expanded polymeric microspheres to form a void structure in cementitious compositions and does not require the production and/or stabilization of air entrained during the mixing process.

The use of expanded polymeric microspheres substantially eliminates some of the practical problems encountered in the current art. It also makes it possible to use some materials, i.e., low grade, high-carbon fly ash, which would otherwise be landfilled because they are considered unusable in air-entrained cementitious compositions without further treatment. This results in cement savings, and therefore economic savings. As the voids "created" by this approach are much smaller than those obtained by conventional air-entraining agents, the volume of expanded polymeric microspheres that is required to achieve the desired durability is also much lower than the void space required in conventional air entrained cementitious compositions. Therefore, a higher compressive strength can be achieved with the present compositions and methods at the same level of protection against freezing and thawing damage. Consequently, the most expensive component used to achieve strength, i.e., cement, can be saved.

The expandable polymeric microspheres may be comprised of a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, and copolymers thereof, such as copolymers of vinylidene chloride-acrylonitrile, polyacrylonitrile-copolymethacrylonitrile, polyvinylidene chloride-polyacrylonitrile, or vinyl chloride-vinylidene chloride, and the like. As the microspheres are composed of polymers, the wall may be flexible, such that it moves in response to pressure. The material from which the microspheres are to be made, therefore, may be flexible, and, in certain embodiments, resistant to the alkaline environment of cementitious compositions. Without limitation, suitable expandable polymeric microspheres are available from Eka Chemicals Inc., an Akzo Nobel company (Duluth, Ga.), under the trade name EXPANCEL®. Non-limiting examples of suitable EXPANCEL® polymeric microspheres include expanded polymeric microspheres having densities in the range of from about 0.01 g/cm$^3$ to about 0.06 g/cm$^3$, optionally from about 0.015 g/cm$^3$ to about 0.025 g/cm$^3$, and sizes in the range of from about 20 µm to about 80 µm.

In certain embodiments, the unexpanded, expandable polymeric microspheres may have an average diameter of about 100 µm or less, in certain embodiments about 50 µm or less, in certain embodiments about 24 µm or less, in certain embodiments about 16 µm or less, in certain embodiments about 15 µm or less, in certain embodiments about 10 µm or less, and in other embodiments about 9 µm or less. In certain embodiments, the average diameter of the unexpanded polymeric microspheres may be from about 10 µm to about 16 µm, in certain embodiments from about 6 µm to about 9 µm, in certain embodiments from about 3 µm to about 6 µm, in certain embodiments from about 9 µm to about 15 µm, and in other embodiments from about 10 µm to about 24 µm. The polymeric microspheres may have a hollow core and compressible wall. The interior portion of the polymeric microspheres comprises a void cavity or cavities that may contain gas (gas filled) or liquid (liquid filled).

In certain embodiments, the expanded, expandable polymeric microspheres may have an average diameter of about 200 to about 900 µm, in certain embodiments, about 40 to about 216 µm, in certain embodiments about 36 to about 135 µm, in certain embodiments about 24 to about 81 µm, and in certain embodiments about 12 to about 54 µm.

The diameters expressed above are volume-average diameters. The diameter of the unexpanded and/or expanded, expandable polymeric microspheres may be determined by any method which is known in the art. For example, the volume-average diameter of the expandable polymeric microspheres may be determined by a light-scattering technique, such as by utilizing a light scattering device available from Malvern Instruments Ltd (Worcestershire, UK).

It has been found that the smaller the diameter of the expandable polymeric microspheres, the smaller the amount of the microspheres that is required to achieve the desired freeze-thaw damage resistance in cementitious compositions. This is beneficial from a performance perspective, in that a smaller decrease in compressive strength occurs by the addition of the microspheres, as well as an economic perspective, since a smaller amount of spheres is required. Similarly, the wall thickness of the polymeric microspheres may be optimized to minimize material cost, but to ensure that the wall thickness is adequate to resist damage and/or fracture during the mixing, placing, consolidating and finishing processes of the cementitious composition.

It has been found to be difficult to uniformly distribute expanded polymeric microspheres within cementitious compositions in commercial cementitious composition manufacturing facilities. Without wishing to be limited by theory, it is believed that the low density and small size of expanded polymeric microspheres results in difficult distribution of the microspheres into cementitious compositions.

Figure 2:
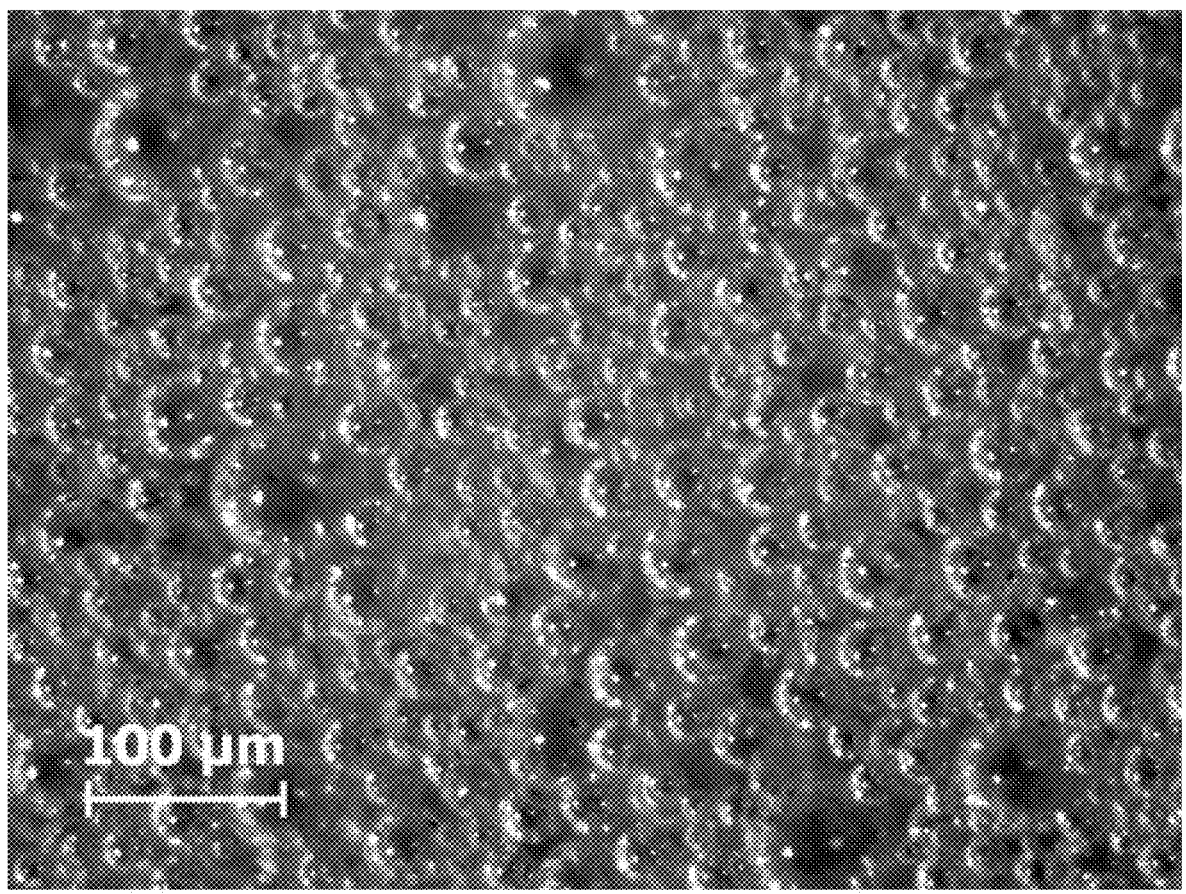
FIG. 2 is a photomicrograph of expanded microspheres dispersed in water.
Figure 3:
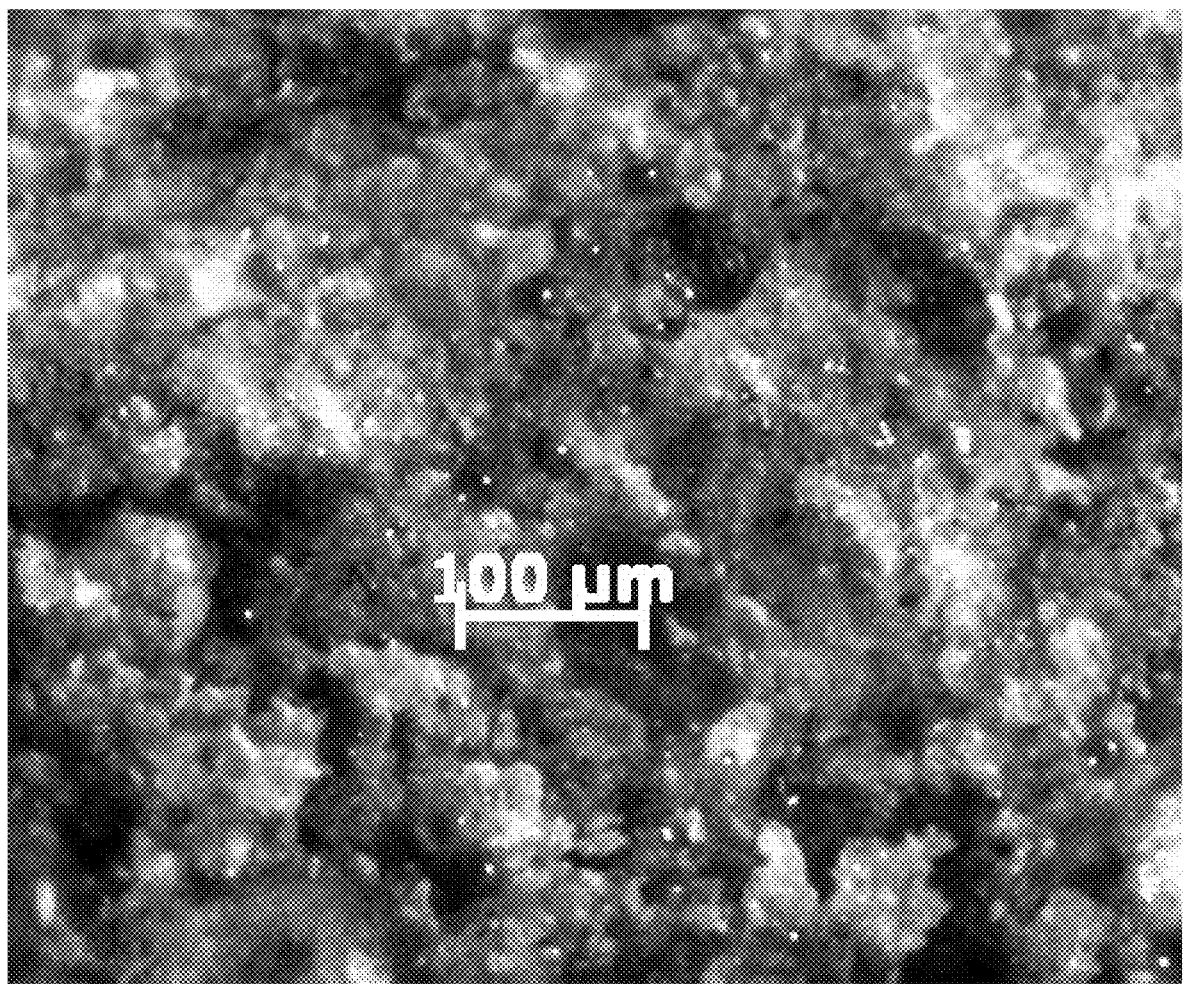
FIG. 3 is a photomicrograph of expanded microspheres in an article of concrete.

Provided is a method of manufacturing a cementitious composition comprising: dispersing expanded polymeric microspheres into a liquid dispersion, such as an aqueous dispersion; and incorporating the liquid dispersion comprising expanded polymeric microspheres into the cementitious composition; wherein the expanded polymeric microspheres are present in the liquid dispersion in an amount of about 0.1 to about 15 percent by weight, based on the total weight of the dispersion, prior to incorporation into the cementitious composition. In certain embodiments, the expanded polymeric microspheres are present in the liquid dispersion in an amount of about 0.3 to about 7.5 percent by weight, based on the total weight of the dispersion, prior to incorporation into the cementitious composition. In certain embodiments, the expanded polymeric microspheres are present in the liquid dispersion in an amount of about 0.75 to about 3 percent by weight, based on the total weight of the dispersion, prior to incorporation into the cementitious composition. FIG. 2 is a photograph of expanded polymeric microspheres dispersed in water. FIG. 3 is a photograph of expanded polymeric microspheres in an article of concrete.

The expanded polymeric microspheres may be dispersed into a liquid dispersion by any suitable method. In certain embodiments, the expanded polymeric microspheres may be simply added to a vessel together with a liquid, such as water, and agitated to create the dispersion immediately prior to incorporation into the cementitious composition. In certain embodiments, the expanded polymeric microspheres may be pumped into a vessel together with a liquid, such as water, and continuously agitated to maintain a homogenous dispersion until it is desired to use the dispersion in a cementitious composition. In certain embodiments, the dispersion may be made at the cementitious composition manufacturing facility or at a facility other than the cementitious composition manufacturing facility and transported to the cementitious composition manufacturing facility.

In certain embodiments, hydrated cementitious compositions may be made by adding the ingredients of the cementitious composition (such as cement, small and/or large aggregate, and/or admixtures) to a mixing vessel (such as, but not limited to, the mixer of a mixing truck) which already includes mixing water, perhaps a majority of the mixing water. The cementitious composition is then at least partially mixed, and additional water may be added to obtain the desired water-to-cement ratio and/or to obtain the desired physical properties of the hydrated cementitious composition. In this context, "mixing water" refers to the water which is added to a mixing vessel prior to addition of all other ingredients of the hydrated cementitious composition.

In certain embodiments, it may be desirable to incorporate the liquid dispersion comprising expanded polymeric microspheres into a majority of mixing water, such as about 70 to about 85 percent of the mixing water, to which the other ingredients of the cementitious composition are subsequently added. In this manner, the expanded polymeric microspheres may be optimally dispersed throughout the cementitious composition.

In certain embodiments, the method comprises expanding unexpanded, expandable polymeric microspheres proximate to and/or during manufacture of the cementitious composition, prior to said dispersing expanded polymeric microspheres into a liquid dispersion. Any suitable method may be used to expand the expandable polymeric microspheres, such as those described in WO 2013/156589 A1, which is incorporated herein by reference. Furthermore, WO 2013/159043 A1 describes an illustrative apparatus which may be used to expand expandable polymeric microspheres.

"Proximate to and/or during manufacture of the cementitious composition" may include at least one of: (i) expanding unexpanded, expandable polymeric microspheres immediately prior to dispersing the expanded polymeric microspheres into the liquid dispersion at the cementitious composition manufacturing facility; or (ii) expanding unexpanded, expandable polymeric microspheres and reserving the expanded polymeric microspheres for dispersing into the liquid dispersion at a later time, at the cementitious composition manufacturing facility. As used herein, "at the cementitious composition manufacturing facility" means that expansion of the unexpanded, expandable polymeric microspheres occurs at the same facility or at an adjacent or proximate facility to where the cementitious composition is manufactured.

In certain embodiments, the liquid dispersion further comprises at least one additional component, such as at least one of a viscosity modifier or sodium hydroxide. The at least one additional component may comprise sodium hydroxide. The viscosity modifier may comprise at least one of a high molecular weight polymeric solution, polyethylene glycols, or polysaccharides. The high molecular weight polymeric solution may comprise celluloses such as hydroxyethyl cellulose or hydroxypropyl cellulose. The polysaccharides may comprise at least one of diutan gum or welan gum. The diutan gum and/or welan gum may be in the form of an aqueous solution.

In certain embodiments, the expanded polymeric microspheres are added to the cementitious composition in an amount of from about 0.1% to about 3% by volume, based on the total volume of the cementitious composition. In certain embodiments, the expanded polymeric microspheres are added to the cementitious composition in an amount of from about 0.5% to about 2% by volume, based on the total volume of the cementitious composition. In certain embodiments, the expanded polymeric microspheres are added to the cementitious composition in an amount of from about 0.75% to about 1.5% by volume, based on the total volume of the cementitious composition. In certain embodiments, the expanded polymeric microspheres are added to the cementitious composition in an amount of from about 0.25% to about 1% by volume, based on the total volume of the cementitious composition.

Also provided is an admixture for cementitious compositions comprising unexpanded, expandable polymeric microspheres and sodium hydroxide. The admixture may further comprise at least one viscosity modifier, such as at least one of a high molecular weight polymeric solution, polyethylene glycols, or polysaccharides. The high molecular weight polymeric solution may comprise celluloses such as hydroxyethyl cellulose or hydroxypropyl cellulose. The polysaccharides may comprise at least one of diutan gum or welan gum. The diutan gum and/or welan gum may be in the form of an aqueous solution.

The cementitious material may be a Portland cement, a calcium aluminate cement, a magnesium phosphate cement, a magnesium potassium phosphate cement, a calcium sulfoaluminate cement or any other suitable hydraulic binder or mixtures thereof. Aggregate may be included in the cementitious composition. The aggregate may be silica, quartz, sand, crushed marble, glass spheres, granite, limestone, calcite, feldspar, alluvial sands, any other durable aggregate, and mixtures thereof.

The following examples are set forth merely to further illustrate the subject methods. The illustrative examples should not be construed as limiting the present subject matter in any manner.

Examples 1 through 4 and Comparative Example 5 were prepared in a laboratory setting. Each of the examples was prepared using 19.1 lbs. cement, 51.1 lbs. sand, 69.7 lbs. stone and 10.53 lbs. water. Example 1 included 2% by volume expanded polymeric microspheres, Example 2 included 1.5% by volume expanded polymeric microspheres, Example 3 included 1% by volume expanded polymeric microspheres, and Example 4 included 0.75% by volume expanded polymeric microspheres, based on the total volume of the cementitious composition. Comparative Example 5 included 5.0 ml of a conventional air entraining admixture.

Examples 1 through 4 and Comparative Example 5 were tested to determine air content according to ASTM C173, slump according to ASTM C143, and freeze-thaw durability according to ASTM C666. Freeze-thaw durability determined according to ASTM C666 is measured by the number of freeze-thaw cycles a sample cementitious article is able to withstand prior to failure. If a sample is able to withstand 300 freeze-thaw cycles, the Durability Factor ("DF") of the sample may be determined, which is a measure of the quality of the sample after 300 freeze-thaw cycles. If a sample withstands at least 300 cycles with a DF of 65 or greater, it is deemed to have passed ASTM C666. The results are shown in Table 1.

TABLE 1

| Example No. | Air Content (%) | Slump (in.) | # of Cycles | DF |
|---|---|---|---|---|
| 1 | 2.3 | 1.75 | 300 | 98 |
| 2 | 2.2 | 2.00 | 300 | 99 |

TABLE 1-continued

| Example No. | Air Content (%) | Slump (in.) | # of Cycles | DF |
|---|---|---|---|---|
| 3 | 2.2 | 2.50 | 300 | 94 |
| 4 | 2.1 | 3.00 | 300 | 95 |
| Comp. 5 | 5.6 | 4.00 | 300 | 97 |

As can be seen from the results in Table 1, Examples 1 through 4 performed just as well as Comparative Example 5 when tested according to ASTM C666, while having less than half the air content of Comparative Example 5.

Comparative Examples 6 was prepared at a commercial cementitious composition manufacturing facility in a cementitious composition mixing truck using 1833 lbs. cement, 3975 lbs. sand, 5430 lbs. stone and 825 lbs. water. Comparative Example 6 also included 12 oz/cwt of a viscosity modifying admixture, 3 oz/cwt of a water reducing admixture, and 1.5 oz/cwt tributyl phosphate. Comparative Example 6 also included 1.5% expanded polymeric microspheres by volume, based on the total volume of the concrete composition, without dispersing the expanded polymeric microspheres prior to incorporation into the concrete composition. When tested according to ASTM C666, Comparative Example 6 failed at 77 cycles.

Comparative Examples 7 was prepared at a commercial cementitious composition manufacturing facility in a cementitious composition mixing truck using 5490 lbs. cement, 11,790 lbs. sand, 15,780 lbs. stone and 2446 lbs. water. Comparative Example 7 also included 10 oz/cwt of a workability-retaining admixture, 12 oz/cwt water reducing admixture, and 1.5 oz/cwt tributyl phosphate. Comparative Example 7 also included 1.5% expanded polymeric microspheres by volume, based on the total volume of the concrete composition, without dispersing the expanded polymeric microspheres prior to incorporation into the concrete composition. When tested according to ASTM C666, Comparative Example 7 failed at 108 cycles.

Comparative Examples 8 through 10 were prepared in central mixer at a commercial cementitious composition manufacturing facility. Each of the Examples included 1.5% expanded polymeric microspheres by volume, based on the total volume of the cementitious composition. The expanded polymeric microspheres were added to the central mixer first, followed by water, stone, cement and sand, in the amounts (lbs.) shown in Table 2. The expanded polymeric microspheres were not dispersed prior to addition into the central mixer. After addition of these ingredients to the central mixer, the central mixer was mixed for 30 seconds with the dust collector turned off. Additional admixtures were added, the dust collector was turned on, and the central mixer was mixed for an additional 2 minutes, after which the cementitious composition was discharged to a mixing truck.

TABLE 2

| Example No. | Cement | Stone | Sand | Water |
|---|---|---|---|---|
| Comp. 8 | 1690 | 5020 | 4020 | 761 |
| Comp. 9 | 3380 | 10,040 | 8040 | 1520 |
| Comp. 10 | 2790 | 8457 | 6325 | 1330 |

Comparative Example 8 consisted of four samples which were tested according to ASTM C666, three of the samples passed ASTM C666 with an average DF of 95, and one sample failed ASTM C666. Comparative Example 9 consisted of four samples which were tested according to ASTM C666, and all four passed ASTM C666 with an average DF of 95. Comparative Example 10 consisted of two samples which were tested according to ASTM C666, which failed at 216 and 288 cycles.

Examples 11 and 12 were prepared in central mixer at a commercial cementitious composition manufacturing facility. Each of the Examples included 0.75% expanded polymeric microspheres by volume, based on the total volume of the cementitious composition. The expanded polymeric microspheres were added to the central mixer first, followed by 1204 lbs. water, 8457 lbs. stone, 2780 lbs. cement and 6355 lbs. sand. The expanded polymeric microspheres were "pre-wetted" by adding water to a bag including the expanded polymeric microspheres and gently agitating the bag, prior to addition to the central mixer. Additional admixtures were added, and the central mixer was mixed for 2 minutes, after which the cementitious composition was discharged to a mixing truck. Examples 11 and 12 were sampled from the same mix, manufactured as described above. Example 11 passed ASTM C666 with a DF of 95 and Example 12 failed ASTM C666 at 180 cycles. Without wishing to be limited by theory, it is believed that the expanded polymeric microspheres were not adequately dispersed by adding water to a bag including the expanded polymeric microspheres and gently agitating the bag.

Example 13 was prepared by first adding expanded polymeric microspheres and water to a 35 gallon bucket and mixing the contents of the bucket to disperse the expanded microspheres. The dispersed, expanded polymeric microspheres were added to a central mixer in an amount of 0.75% by volume, based on the total volume of the cementitious composition, along with 2580 lbs. cement, 6782 lbs. sand, 8500 lbs. stone, 1109 lbs. water, and 8.0 oz/cwt water reducing admixture. Example 13 had 3.2% air content, as determined by ASTM C173, and a slump of 3.75 inches, as determined by ASTM C143. Example 13 passed ASTM C666 with a DF of 91.

Comparative Example 14 and Examples 15 through 26 were prepared in a central mixer, with cement ("C"; lbs.), fly ash ("FA"; lbs.), stone ("ST"; lbs.), sand ("SA"; lbs.), water ("W"; lbs.), viscosity modifying admixture ("VMA"; oz/cwt) and water reducing admixture ("WRA"; oz/cwt), in the amounts shown in Table 3. Comparative Example 14 included 0.6 oz/cwt of a conventional air entraining admixture. Examples 15 through 18 included expanded polymeric microspheres in an amount of 0.75% by volume, based on the total volume of the cementitious composition. Examples 19 through 22 included expanded polymeric microspheres in an amount of 1.0% by volume, based on the total volume of the cementitious composition. Examples 23 through 26 included expanded polymeric microspheres in an amount of 1.5% by volume, based on the total volume of the cementitious composition. Table 3 also shows the slump ("SP"; in.) according to ASTM C143 and the air content ("AC"; %) according to ASTM C173. All of Comparative Example 14 and Examples 15 through 26 passed ASTM C666, and Table 3 shows the durability factor ("DF") of each example.

TABLE 3

| Ex. No. | C | FA | ST | SA | W | VMA | WRA | SP | AC | DF |
|---|---|---|---|---|---|---|---|---|---|---|
| C. 14 | 2800 | 300 | 8615 | 6733 | 1367 | 3.0 | 1.9 | 5.25 | 8.0 | 97 |
| 15 | 1875 | 1250 | 8325 | 7705 | 1378 | 3.1 | 2.0 | 5.50 | 2.8 | 100 |
| 16 | 2000 | 1125 | 8310 | 7746 | 1378 | 2.8 | 1.9 | 5.00 | 3.0 | 97 |
| 17 | 2125 | 1000 | 8310 | 7773 | 1378 | 3.0 | 2.5 | 4.00 | 3.0 | 99 |
| 18 | 2915 | 315 | 8805 | 6993 | 1523 | 2.9 | 1.9 | 6.00 | 2.6 | 98 |
| 19 | 1875 | 1250 | 8310 | 7718 | 1378 | 3.0 | 2.5 | 6.00 | 3.0 | 100 |
| 20 | 2000 | 1125 | 8310 | 7746 | 1378 | 3.0 | 2.0 | 5.00 | 3.4 | 99 |
| 21 | 2125 | 1000 | 8310 | 7773 | 1378 | 3.0 | 2.5 | 4.25 | 3.3 | 98 |
| 22 | 2915 | 315 | 8805 | 6993 | 1523 | 3.0 | 1.9 | 5.50 | 2.9 | 96 |
| 23 | 1875 | 1250 | 8310 | 7718 | 1378 | 3.1 | 2.0 | 5.00 | 3.0 | 100 |
| 24 | 2000 | 1125 | 8310 | 7746 | 1378 | 3.0 | 3.0 | 5.75 | 3.0 | 100 |
| 25 | 2125 | 1000 | 8310 | 7773 | 1378 | 3.1 | 3.1 | 5.75 | 3.3 | 100 |
| 26 | 2915 | 315 | 8805 | 6993 | 1523 | 3.0 | 3.0 | 7.00 | 3.2 | 100 |

Comparative Example 27 and Examples 28 through 51 were prepared directly in a cementitious composition mixing truck via a dry batch application, with cement ("C"; lbs.), fly ash ("FA"; lbs.), stone ("ST"; lbs.), sand ("SA"; lbs.), water ("W"; lbs.), viscosity modifying admixture ("VMA"; oz/cwt) and water reducing admixture ("WRA"; oz/cwt), in the amounts shown in Table 4. Comparative Example 27 included 0.5 oz/cwt of a conventional air entraining admixture. Examples 28 through 31 and 40 through 43 included expanded polymeric microspheres in an amount of 0.75% by volume, based on the total volume of the cementitious composition. Examples 32 through 35 and 44 through 47 included expanded polymeric microspheres in an amount of 1.0% by volume, based on the total volume of the cementitious composition. Examples 36 through 39 and 48 through 51 included expanded polymeric microspheres in an amount of 1.5% by volume, based on the total volume of the cementitious composition. Table 4 also shows the slump ("SP"; in.) according to ASTM C143 and the air content ("AC"; %) according to ASTM C173. All of Comparative Example 27 and Examples 28 through 51 passed ASTM C666, except Example 32, and Table 3 shows the durability factor ("DF") of each example. Example 32 could not be tested according to ASTM C666 because the specimens were broken during transportation.

The Examples and Comparative Examples presented above show that dispersing the expanded polymeric microspheres prior to incorporation into a cementitious composition allowed for lower dosages of expanded polymeric microspheres than were required in cementitious compositions which utilized expanded polymeric microspheres which were not dispersed prior to incorporation into the cementitious compositions. As Comparative Examples 8 through 10 show, a dosage of 1.5% by volume of expanded polymeric microspheres results in unpredictable ASTM C666 results, if the expanded polymeric microspheres are not dispersed prior to incorporation into the cementitious composition. In contrast, Examples 13, 15 through 18, 28 through 31, and 40 through 43 were able to pass ASTM C666 with a dosage of 0.75% by volume expanded polymeric microspheres which were dispersed prior to incorporation into the cementitious composition.

Without wishing to be limited by theory, it is believed that dispersing the expanded polymeric microspheres prior to incorporation into cementitious compositions allows for a more uniform distribution of expanded polymeric microspheres in the cementitious compositions, which results in more predictable physical properties of the cementitious compositions even at lower dosages of expanded polymeric microspheres, as compared to cementitious compositions

TABLE 4

| Ex. No. | C | FA | ST | SA | W | VMA | WRA | SP | AC | DF |
|---|---|---|---|---|---|---|---|---|---|---|
| C. 27 | 2800 | 300 | 8675 | 6683 | 1365 | 3.0 | 3.0 | 9.25 | 8.2 | 100 |
| 28 | 1875 | 1250 | 8375 | 7591 | 1378 | 3.0 | 3.0 | 10.75 | 4.8 | 100 |
| 29 | 2000 | 1125 | 8380 | 7614 | 1378 | 3.0 | 1.5 | 8.75 | 2.5 | 100 |
| 30 | 2125 | 1000 | 8380 | 7641 | 1378 | 3.0 | 1.5 | 8.00 | 2.4 | 100 |
| 31 | 2915 | 315 | 8885 | 6852 | 1523 | 3.0 | 1.5 | 8.75 | 2.2 | 99 |
| 32 | 1875 | 1250 | 8380 | 7587 | 1378 | 3.0 | 1.5 | 9.25 | 2.6 | N/A |
| 33 | 2000 | 1125 | 8380 | 7614 | 1378 | 3.0 | 1.5 | 7.50 | 2.8 | 100 |
| 34 | 2125 | 1000 | 8380 | 7641 | 1378 | 3.0 | 1.5 | 7.75 | 3.8 | 100 |
| 35 | 2915 | 315 | 8885 | 6852 | 1523 | 3.0 | 1.5 | 7.25 | 2.7 | 97 |
| 36 | 1875 | 1250 | 8380 | 7587 | 1378 | 3.0 | 1.5 | 4.50 | 3.5 | 100 |
| 37 | 2000 | 1125 | 8380 | 7614 | 1378 | 3.0 | 2.5 | 7.75 | 5.5 | 100 |
| 38 | 2125 | 1000 | 8380 | 7641 | 1378 | 3.0 | 2.2 | 5.75 | 3.5 | 100 |
| 39 | 2915 | 315 | 8885 | 6852 | 1523 | 3.0 | 1.5 | 7.00 | 3.0 | 98 |
| 40 | 1875 | 1250 | 8380 | 7587 | 1378 | 3.0 | 1.5 | 7.00 | 2.6 | 96 |
| 41 | 2000 | 1125 | 8380 | 7614 | 1378 | 3.0 | 1.5 | 7.00 | 2.5 | 100 |
| 42 | 2125 | 1000 | 8380 | 7641 | 1378 | 3.0 | 1.5 | 8.00 | 3.2 | 95 |
| 43 | 2915 | 315 | 8885 | 6852 | 1523 | 3.0 | 1.5 | 7.00 | 2.6 | 100 |
| 44 | 3750 | 2500 | 16760 | 15173 | 2755 | 3.0 | 1.5 | 8.00 | 2.6 | 100 |
| 45 | 4000 | 2250 | 16760 | 15228 | 2755 | 3.0 | 1.5 | 6.00 | 3.0 | 95 |
| 46 | 4250 | 2000 | 16760 | 15283 | 2755 | 3.0 | 1.5 | 6.50 | 3.5 | 100 |
| 47 | 5830 | 630 | 17770 | 13705 | 3045 | 3.0 | 1.5 | 7.50 | 3.2 | 100 |
| 48 | 3750 | 2500 | 16760 | 15173 | 2755 | 3.0 | 1.5 | 6.50 | 3.5 | 100 |
| 49 | 4000 | 2250 | 16760 | 15228 | 2755 | 3.0 | 1.5 | 7.25 | 3.1 | 100 |
| 50 | 4250 | 2000 | 16680 | 15357 | 2755 | 3.0 | 1.5 | 7.75 | 3.3 | 100 |
| 51 | 1749 | 189 | 5304 | 4136 | 914 | 3.0 | 1.5 | 7.00 | 3.1 | 100 | prepared without dispersing the microspheres prior to incorporation. Furthermore, subsequent to the experimentation described herein, it was determined that preparation of Examples 1 through 4 in a laboratory setting resulted in unintentional dispersion of the expanded polymeric microspheres prior to incorporation into the cementitious composition.

A cementitious composition made using the method(s) described herein may contain other admixtures or ingredients and should not be necessarily limited to the stated formulations. These admixtures and/or ingredients that may be added include, but are not limited to: aggregates, pozzolanic materials, dispersants, set and strength accelerators/enhancers, set retarders, water reducers, corrosion inhibitors, wetting agents, water soluble polymers, rheology modifying agents, water repellents, non-degrading fibers, dampproofing admixtures, permeability reducers, fungicidal admixtures, germicidal admixtures, insecticide admixtures, alkali-reactivity reducer, bonding admixtures, shrinkage reducing admixtures, and any other admixture or additive suitable for use in cementitious compositions. The admixtures and cementitious compositions described herein need not contain any of the foregoing components, but may contain any number of the foregoing components.

Aggregate may be included in the cementitious composition to provide mortars which include fine aggregate, and concretes which include fine and coarse aggregates. The fine aggregates are materials that almost entirely pass through a Number 4 sieve (ASTM C 125 and ASTM C 33), such as silica sand. The coarse aggregates are materials that are predominantly retained on a Number 4 sieve (ASTM C 125 and ASTM C 33), such as silica, quartz, crushed marble, glass spheres, granite, limestone, calcite, feldspar, alluvial sands, sands or any other durable aggregate, and mixtures thereof.

A pozzolanic material is a siliceous or aluminosiliceous material that possesses little or no cementitious value but will, in the presence of water and in finely divided form, chemically react with the calcium hydroxide produced during the hydration of Portland cement to form materials with cementitious properties. Diatomaceous earth, opaline cherts, clays, shales, fly ash, slag, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C618.

If used, silica fume can be uncompacted or can be partially compacted or added as a slurry. Silica fume additionally reacts with the hydration byproducts of the cement binder, which provides for increased strength of the finished articles and decreases the permeability of the finished articles. The silica fume, or other pozzolans such as fly ash or calcined clay such as metakaolin, can be added to the cementitious wet cast mixture in an amount from about 5% to about 70% based on the weight of cementitious material.

A dispersant, if used, can be any suitable dispersant such as lignosulfonates, beta naphthalene sulfonates, sulfonated melamine formaldehyde condensates, polyaspartates, polycarboxylates with and without polyether units, naphthalene sulfonate formaldehyde condensate resins, or oligomeric dispersants.

Polycarboxylate dispersants can be used, by which is meant a dispersant having a carbon backbone with pendant side chains, wherein at least a portion of the side chains are attached to the backbone through a carboxyl group, an ether group, or an amide or imide group. The term dispersant is also meant to include those chemicals that also function as a plasticizer, high range water reducer, fluidizer, antiflocculating agent, or superplasticizer for cementitious compositions.

The term oligomeric dispersant refers to oligomers that are a reaction product of: component A, optionally component B, and component C; wherein each component A is independently a nonpolymeric, functional moiety that adsorbs onto a cementitious particle; wherein component B is an optional moiety, where if present, each component B is independently a nonpolymeric moiety that is disposed between the component A moiety and the component C moiety; and wherein component C is at least one moiety that is a linear or branched water soluble, nonionic polymer substantially non-adsorbing to cement particles. Oligomeric dispersants are disclosed in U.S. Pat. Nos. 6,133,347, 6,492, 461, and 6,451,881.

Set and strength accelerators/enhancers that can be used include, but are not limited to: a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; and/or a halide salt of an alkali metal or alkaline earth metal (preferably bromide).

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c[(CH_2)_dCHRCH_2R]_e$, where R is independently H or OH, c is 3-e, d is 0 to about 4 and e is 1 to about 3. Examples include, but are not limited to, are monoethanolamine, diethanolamine, triethanolamine and triisopropanolamine.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. An example of carboxylic acid salt is calcium formate.

A polyhydroxyalkylamine may have the general formula:

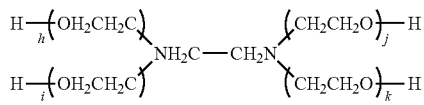

wherein h is 1 to 3, i is 1 to 3, j is 1 to 3, and k is 0 to 3. A preferred polyhydroxyalkylamine is tetrahydroxyethylethylenediamine.

Set retarding, or also known as delayed-setting or hydration control, admixtures are used to retard, delay, or slow the rate of setting of cementitious compositions. Set retarders are used to offset the accelerating effect of hot weather on the setting of cementitious compositions, or delay the initial set of cementitious compositions when difficult conditions of placement occur, or problems of delivery to the job site, or to allow time for special finishing processes. Most set retarders also act as low level water reducers and can also be used to entrain some air into cementitious compositions. Lignosulfonates, hydroxylated carboxylic acids, borax, gluconic, tartaric and other organic acids and their corresponding salts, phosphonates, certain carbohydrates such as sugars, polysaccharides and sugar-acids and mixtures thereof can be used as retarding admixtures.

Corrosion inhibitors serve to protect embedded reinforcing steel from corrosion. The high alkaline nature of cementitious compositions causes a passive and non-corroding protective oxide film to form on the steel. However, carbonation or the presence of chloride ions from deicers or seawater, together with oxygen can destroy or penetrate the film and result in corrosion. Corrosion-inhibiting admixtures chemically slow this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

In the construction field, many methods of protecting cementitious compositions from tensile stresses and subsequent cracking have been developed through the years. One modern method involves distributing fibers throughout a fresh cementitious mixture. Upon hardening, this cementitious composition is referred to as fiber-reinforced cement. Fibers can be made of zirconium materials, carbon, steel, fiberglass, or synthetic materials, e.g., polypropylene, nylon, polyethylene, polyester, rayon, high-strength aramid, or mixtures thereof.

Dampproofing admixtures reduce the permeability of concrete that has low cement contents, high water-cement ratios, or a deficiency of fines in the aggregate portion. These admixtures retard moisture penetration into wet concrete and include certain soaps, stearates, and petroleum products.

Permeability reducers are used to reduce the rate at which water under pressure is transmitted through cementitious compositions. Silica fume, fly ash, ground slag, metakaolin, natural pozzolans, water reducers, and latex can be employed to decrease the permeability of the cementitious compositions.

Bacteria and fungal growth on or in hardened cementitious compositions may be partially controlled through the use of fungicidal, germicidal, and insecticidal admixtures. The most effective materials for these purposes are polyhalogenated phenols, dialdrin emulsions, and copper compounds.

Coloring admixtures are usually composed of pigments, either organic such as phthalocyanine or inorganic pigments such as metal-containing pigments that comprise, but are not limited to metal oxides and others, and can include, but are not limited to, iron oxide containing pigments, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, ultramarine blue and cobalt blue.

Alkali-reactivity reducers can reduce the alkali-aggregate reaction and limit the disruptive expansion forces that this reaction can produce in hardened cementitious compositions. Pozzolans (fly ash, silica fume), blast-furnace slag, salts of lithium and barium are especially effective.

The shrinkage reducing agent which can be used comprises but is not limited to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide.

The above listings of additional admixtures and additives are illustrative and not exhaustive or limiting.

In a first embodiment, provided is a method of manufacturing a cementitious composition comprising: dispersing expanded polymeric microspheres into a liquid dispersion, optionally wherein the liquid dispersion comprises an aqueous dispersion; and incorporating the liquid dispersion comprising expanded polymeric microspheres into the cementitious composition; wherein the expanded polymeric microspheres are present in the liquid dispersion in an amount of about 0.1 to about 15 percent by weight, optionally about 0.3 to about 7.5 percent by weight, further optionally about 0.75 to about 3 percent by weight, based on the total weight of the dispersion, prior to incorporation into the cementitious composition.

The method of the first embodiment may further comprise expanding unexpanded, expandable polymeric microspheres proximate to and/or during manufacture of the cementitious composition, prior to said dispersing expanded polymeric microspheres into a liquid dispersion.

The method of either or both of the first or subsequent embodiment may further include that the liquid dispersion further comprises at least one additional component. The at least one additional component may comprise at least one of a viscosity modifier or sodium hydroxide. The at least one additional component may comprise sodium hydroxide. The viscosity modifier may comprise at least one of a high molecular weight polymeric solution, polyethylene glycols, or polysaccharides. The high molecular weight polymeric solution may comprise celluloses, optionally at least one of hydroxyethyl cellulose or hydroxypropyl cellulose. The polysaccharides may comprise at least one of diutan gum or welan gum, optionally in an aqueous solution.

The method of any one of the first or subsequent embodiments may further include that the expanded polymeric microspheres are added to the cementitious composition in an amount of from about 0.1% to about 3% by volume, optionally from about 0.5% to about 2% by volume, further optionally from about 0.75% to about 1.5% by volume, further optionally from about 0.25% to about 1% by volume, based on the total volume of the cementitious composition.

The method of any one of the first or subsequent embodiments may further include that the liquid dispersion comprising expanded polymeric microspheres is incorporated into a majority of mixing water, optionally from about 70 to about 85 percent of the mixing water, to which other ingredients of the cementitious composition are subsequently added.

In a second embodiment, provided is an admixture for cementitious compositions comprising unexpanded, expandable polymeric microspheres and sodium hydroxide.

The second embodiment may further comprise at least one viscosity modifier. The viscosity modifier may comprise at least one of a high molecular weight polymeric solution, polyethylene glycols, or polysaccharides. The high molecular weight polymeric solution may comprise celluloses, optionally at least one hydroxyethyl cellulose or hydroxypropyl cellulose. The polysaccharides may comprise at least one of diutan gum or welan gum, optionally in an aqueous solution.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

The invention claimed is:

1. A method of manufacturing a cementitious composition comprising:
   dispersing expanded polymeric microspheres into an aqueous liquid to create an aqueous liquid dispersion of expanded polymeric microspheres, wherein the expanded polymeric microspheres are present in the aqueous liquid dispersion in an amount of about 0.1 to about 15 percent by weight, based on the total weight of the liquid dispersion;
   adding the aqueous liquid dispersion to a majority of mixing water for a cementitious composition, to which other ingredients of the cementitious composition are subsequently added, to disperse the expanded polymeric microspheres in the mixing water; and
   subsequently adding cement, sand, and stone to said mixing water containing the aqueous liquid dispersion of expanded polymeric microspheres to create a cementitious composition comprising the cement, the sand, the stone, and the expanded microspheres dispersed in the cementitious composition, wherein the expanded polymeric microspheres are present in the cementitious composition in an amount of from about 0.1 to about 3 percent by volume, based on the total volume of the cementitious composition,
   wherein said cementitious composition exhibits a Durability Factor of 65 or greater after 300 freeze-thaw cycles as tested in accordance with ASTM D666.

2. The method of claim 1, wherein the expanded polymeric microspheres are present in the aqueous liquid dispersion in an amount of about 0.3 to about 7.5 percent by weight, based on the total weight of the dispersion, prior to incorporation into the cementitious composition.

3. The method of claim 2, wherein the expanded polymeric microspheres are present in the aqueous liquid dispersion in an amount of about 0.75 to about 3 percent by weight, based on the total weight of the dispersion, prior to incorporation into the cementitious composition.

4. The method of claim 1, wherein the expanded polymeric microspheres are present in the cementitious composition in an amount of from about 0.75 percent to about 1.5 percent by volume, based on the total volume of the cementitious composition.

5. The method of claim 1, wherein the expanded polymeric microspheres are added to the cementitious composition an amount of from about 0.25 percent to about 1 percent by volume, based on the total volume of the cementitious composition.

6. The method of claim 1, wherein the majority of the mixing water comprises from about 70 to about 85 percent of the mixing water for the cementitious composition.

7. The method of claim 1, wherein said cementitious composition exhibits a Durability Factor of 75 or greater after 300 freeze-thaw cycle as tested in accordance with ASTM D666.

8. The method of claim 1, wherein said cementitious composition exhibits a Durability Factor of 85 or greater after 300 freeze-thaw cycle as tested in accordance with ASTM D666.

9. The method of claim 1, wherein said cementitious composition exhibits a Durability Factor of 95 or greater after 300 freeze-thaw cycle as tested in accordance with ASTM D666.

10. The method of claim 1, further comprising expanding unexpanded expandable polymeric microspheres prior to said dispersing expanded polymeric microspheres in the aqueous liquid dispersion.

11. The method of claim 10, wherein the step of expanding the unexpanded expandable polymeric microspheres is proximate to and/or during manufacture of the cementitious composition.

12. The method of claim 1, wherein the aqueous liquid dispersion further comprises at least one additional component.

13. The method of claim 12, wherein the at least on additional component comprises at least one of a viscosity modifier or sodium hydroxide.

14. The method of claim 13, wherein the at least on additional component comprises sodium hydroxide.

15. The method of claim 13, wherein the viscosity modifier comprises at least one of a high molecular weight polymeric solution, polyethylene glycols, or polysaccharides.

16. The method of claim 15, wherein the high molecular weight polymeric solution comprises celluloses.

17. The method of claim 15, wherein the polysaccharides comprise at least one of diutan gum or welan gum.

18. The method of claim 1, wherein the expanded polymeric microspheres have densities in the range of from about 0.01 g/cm$^3$ to about 0.06 g/cm$^3$.

19. The method of claim 1, wherein the unexpanded expandable polymeric microspheres have an average diameter of about 100 μm or less.

20. The method of claim 1, wherein the unexpanded expandable polymeric microspheres have a density from about 0.015 g/cm$^3$ to about 0.025 g/cm$^3$ and a diameter in the range of from about 20 μm to about 80 μm.

* * * * *